(12) United States Patent
Hara et al.

(10) Patent No.: US 10,570,779 B2
(45) Date of Patent: Feb. 25, 2020

(54) TURBINE HOUSING (71) Applicant: CALSONIC KANSEI CORPORATION, Saitama-shi, Saitama (JP)

(72) Inventors: Masayuki Hara, Saitama (JP); Satoru Yokoshima, Saitama (JP); Tooru Iijima, Saitama (JP); Yasunori Kozuka, Saitama (JP); Etsuo Kobayashi, Saitama (JP); Naoki Tobari, Saitama (JP)

(73) Assignee: CALSONIC KANSEI CORPORATION, Saitama-Shi (JP)

( * ) Notice: Subject to any disclaimer, the term of this patent is extended or adjusted under 35 U.S.C. 154(b) by 173 days.

(21) Appl. No.: 15/560,430

(22) PCT Filed: Mar. 11, 2016

(86) PCT No.: PCT/JP2016/057803
§ 371 (c)(1),
(2) Date: Sep. 21, 2017

(87) PCT Pub. No.: WO2016/152586
PCT Pub. Date: Sep. 29, 2016

(65) Prior Publication Data
US 2018/0066541 A1    Mar. 8, 2018

(30) Foreign Application Priority Data
Mar. 23, 2015 (JP) .................................. 2015-059441

(51) Int. Cl.
F01D 25/26    (2006.01)
F02B 39/00    (2006.01)
(Continued)

(52) U.S. Cl.
CPC ............... *F01D 25/26* (2013.01); *B23K 9/00* (2013.01); *B23K 9/02* (2013.01); *F01D 21/045* (2013.01);
(Continued)

(58) Field of Classification Search
None
See application file for complete search history.

(56) References Cited

U.S. PATENT DOCUMENTS 3,880,435 A * 4/1975 Thornbald ............... F01D 11/08
  277/416
4,122,673 A * 10/1978 Leins ................. B01D 53/9413
  415/177

(Continued)

FOREIGN PATENT DOCUMENTS

CN    101881188 A    11/2010
CN    202300552 U    7/2012
(Continued)

OTHER PUBLICATIONS

Fricke, Wolfgang, "IIW guideline for the assessment of weld root fatigue," Weld World, vol. 57I, No. 6, Nov. 2013, pp. 753-791.

*Primary Examiner* — Michael Lebentritt
(74) *Attorney, Agent, or Firm* — Foley & Lardner LLP (57) ABSTRACT A turbine housing includes an inner pipe that forms an exhaust air flow path in which a turbine wheel accommodating a turbine shaft is arranged; and an outer pipe that is spaced from the inner pipe at a predetermined distance and covers the inner pipe. At least one reinforcing plate is secured to an inner surface of the outer pipe.

5 Claims, 8 Drawing Sheets (51) Int. Cl.
  *B23K 9/02* (2006.01)
  *F01D 25/24* (2006.01)
  *B23K 9/00* (2006.01)
  *F02B 39/16* (2006.01)
  *F01D 21/04* (2006.01)
  *F01D 25/04* (2006.01)
  *F02B 37/00* (2006.01)

(52) U.S. Cl.
  CPC .............. *F01D 25/04* (2013.01); *F01D 25/24* (2013.01); *F02B 39/00* (2013.01); *F02B 39/16* (2013.01); *F02B 37/00* (2013.01); *F05D 2220/40* (2013.01); *F05D 2230/232* (2013.01); *F05D 2260/96* (2013.01)

(56) References Cited

U.S. PATENT DOCUMENTS

| | | | |
|---|---|---|---|
| 4,875,837 A | 10/1989 | Usami et al. | |
| 2010/0005798 A1* | 1/2010 | Finkbeiner | F01D 9/023 60/597 |
| 2010/0074744 A1* | 3/2010 | Phillips, Jr. | F01D 9/026 415/208.1 |
| 2010/0098533 A1* | 4/2010 | Grussmann | F01D 9/02 415/203 |
| 2010/0284792 A1 | 11/2010 | Ballard et al. | |
| 2010/0316494 A1* | 12/2010 | Gru mann | F01D 25/26 415/231 |
| 2011/0083433 A1 | 4/2011 | Stroph et al. | |
| 2011/0120124 A1* | 5/2011 | Czerwinski | F01D 17/165 60/605.1 |
| 2011/0236197 A1* | 9/2011 | Burmeister | F01D 17/165 415/204 |
| 2011/0274542 A1* | 11/2011 | Inoshita | F01D 9/026 415/213.1 |
| 2011/0286837 A1* | 11/2011 | Smatloch | F01D 25/243 415/170.1 |
| 2012/0148391 A1* | 6/2012 | Ibaraki | F04D 29/023 415/200 |
| 2012/0235407 A1* | 9/2012 | Blackie | F01N 13/102 285/398 |
| 2012/0275914 A1* | 11/2012 | Yokoyama | F01D 25/24 415/204 |
| 2013/0064655 A1* | 3/2013 | Smatloch | F01D 9/026 415/182.1 |
| 2013/0156567 A1* | 6/2013 | Nagae | F01D 25/24 415/205 |
| 2013/0302159 A1* | 11/2013 | Grussmann | F01D 25/243 415/215.1 |
| 2015/0176433 A1* | 6/2015 | Schlegl | F01D 17/105 415/145 |
| 2015/0322850 A1* | 11/2015 | Vardhana | F01D 25/166 415/177 |
| 2015/0330405 A1* | 11/2015 | Fischer | F01D 25/125 415/200 |
| 2016/0281590 A1* | 9/2016 | Erdel | F02B 37/001 |
| 2016/0341057 A1* | 11/2016 | Akiyama | F01N 13/10 |
| 2018/0216494 A1* | 8/2018 | Azuma | F01D 5/043 |
| 2018/0223679 A1* | 8/2018 | Yokoyama | F02B 39/00 |
| 2018/0252160 A1* | 9/2018 | Hoecker | F01D 17/14 |
| 2018/0328226 A1* | 11/2018 | Yokoshima | F01D 9/026 |
| 2019/0071973 A1* | 3/2019 | Sakisaka | F04D 29/263 |

FOREIGN PATENT DOCUMENTS

| | | |
|---|---|---|
| DE | 10022052 A1 | 3/2001 |
| DE | 10218436 C1 | 8/2003 |
| EP | 1 357 278 B1 | 4/2006 |
| JP | S62-67237 A | 3/1987 |
| JP | 2002-054447 A | 2/2002 |
| JP | 2006-161579 A | 6/2006 |
| JP | 2011-085139 A | 4/2011 |

* cited by examiner

TURBINE HOUSING

TECHNICAL FIELD

The present invention relates to a turbine housing made of a sheet metal for use in a turbo charger (turbo supercharger) of a vehicle.

BACKGROUND ART

A turbine housing for use in a turbo charger is generally produced by casting. On the other hand, a turbine housing partially made of a sheet metal is disclosed in Patent Literature 1. The turbine housing is illustrated in FIG. 8.

Figure 8:
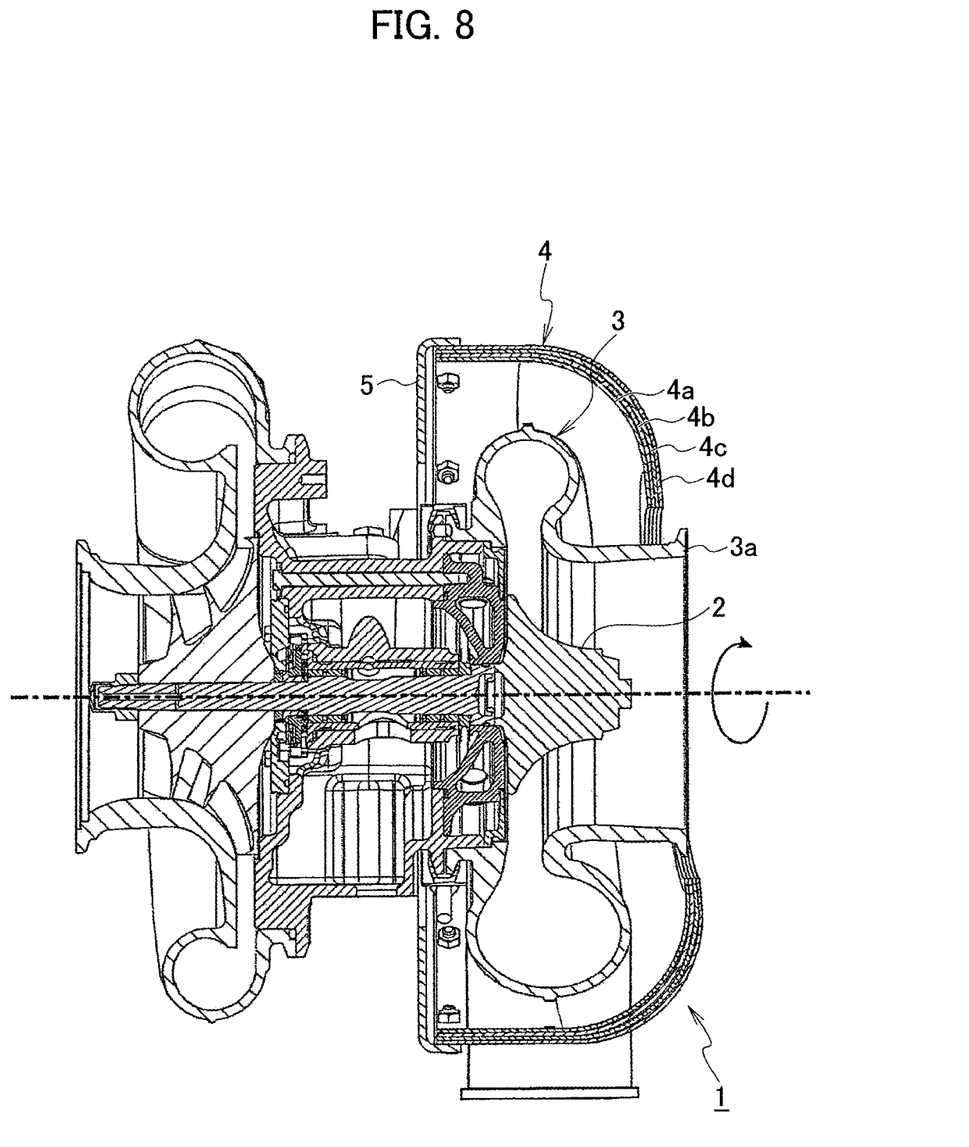
FIG. 8 is a side view of a turbine housing made of a sheet metal for use in a conventional turbo charger.

As illustrated in FIG. 8, a turbine housing 1 for a turbo supercharger includes an inner pipe 3 forming an exhaust air flow path in which a turbine wheel 2 is arranged and an outer pipe 4 spaced from the inner pipe 3 at a predetermined distance and covering the inner pipe 3.

To cause the outer pipe 4 to function as a breakage protection device, the outer pipe 4 is a multi-layered structure in which a plurality of metal thin plates 4a to 4d are laminated between a back plate 5 and an opening end 3a of the inner pipe 3, and breaking strength of the outer pipe 4 is heightened.

CITATION LIST

Patent Literature

Patent Literature 1: JP 2011-85139 A

SUMMARY OF INVENTION

Technical Problem

However, in the aforementioned conventional turbine housing 1, while the rigidity of the entire outer pipe 4 is heightened, the outer pipe 4 may be strained when high-temperature exhaust air flows since the amounts of heat that the plurality of metal thin plates 4a to 4d included in the outer pipe 4 receive differ from each other, that is, since the amount of heat expansion of the metal thin plate 4a on the inner side is larger than the amount of heat expansion of the metal thin plate 4d on the outer side.

The present invention is accomplished to solve the aforementioned problem, and an object thereof is to provide a turbine housing enabling strain and deformation of a thin plate member included in an outer pipe to be reliably prevented and enabling amplitude of the outer pipe to be attenuated.

Solution to Problem

A turbine housing according to an aspect of the present invention includes an inner pipe forming an exhaust air flow path in which a turbine wheel accommodating a turbine shaft is arranged; and an outer pipe spaced from the inner pipe at a predetermined distance and covering the inner pipe. At least one reinforcing plate is secured to an inner surface of the outer pipe.

In the turbine housing, a plurality of the reinforcing plates may be secured to the inner surface of the outer pipe, and a space may be formed between respective ends of the respective reinforcing plates adjacent to each other.

In the turbine housing, the outer pipe may further include a plurality of thin plate members, and the thin plate members may overlap with and may be secured to each other by welding in an axial direction of the turbine shaft, and at least one of the reinforcing plates may be secured to each inner surfaces of the thin plate members.

The space may be formed to cover an overlapping part of the thin plate members.

Each of the reinforcing plates of the turbine housing may be secured by at least one-point welding.

Furthermore, a symmetry center of each of the reinforcing plates may be partially welded.

Advantageous Effects of Invention

As described above, with the turbine housing according to the aspect of the present invention, by securing the reinforcing plate to the inner surface of the outer pipe, amplitude of the entire outer pipe can be attenuated.

Also, with the turbine housing, by forming the space between the respective ends of the adjacent reinforcing plates, collision between the adjacent reinforcing plates caused by heat expansion can be prevented.

The outer pipe is formed by the plurality of thin plate members obtained by dividing the outer pipe in the axial direction of the turbine shaft of the turbine wheel, which is a vibration direction when a vehicle runs, and the adjacent ends of the plurality of thin plate members are connected by welding. Accordingly, stress resulting from vibration when the vehicle runs can be alleviated. Thus, breakage of the welded part of the adjacent ends of the plurality of thin plate members can be prevented. By securing the reinforcing plate to the inner surface of each of the thin plate members, the amplitude of the entire outer pipe can be attenuated more reliably.

By providing the space between the ends of the reinforcing plates to cover the overlapping part of the plurality of thin plates included in the outer pipe, an effect on the entire rigidity can further be decreased than in a case of providing the space in a single-layered part.

By securing the reinforcing plate to the inner surface of the thin plate member by at least one-point welding, strain of the thin plate member caused by heat expansion can effectively be prevented.

In the turbine housing, by partially welding the reinforcing plate in the symmetry center, the thin plate member can symmetrically be heat-expanded, and strain and stress at a welded point can effectively be dispersed.

DESCRIPTION OF EMBODIMENTS

Hereinbelow, embodiments of the present invention will be described with reference to the drawings.

Figure 1:
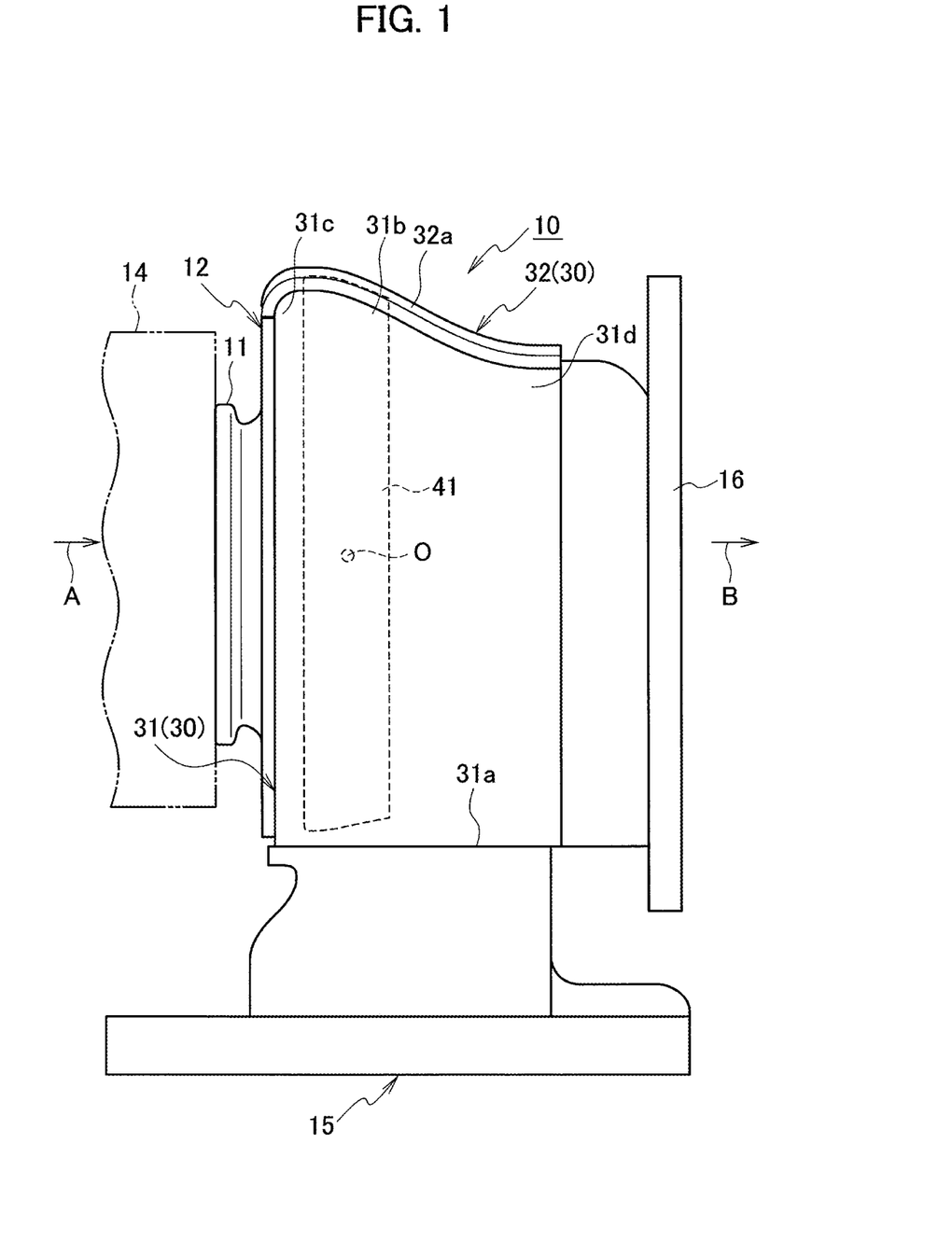
FIG. 1 is a side view of a turbine housing made of a sheet metal for use in a turbo charger according to a first embodiment of the present invention.
Figure 2:
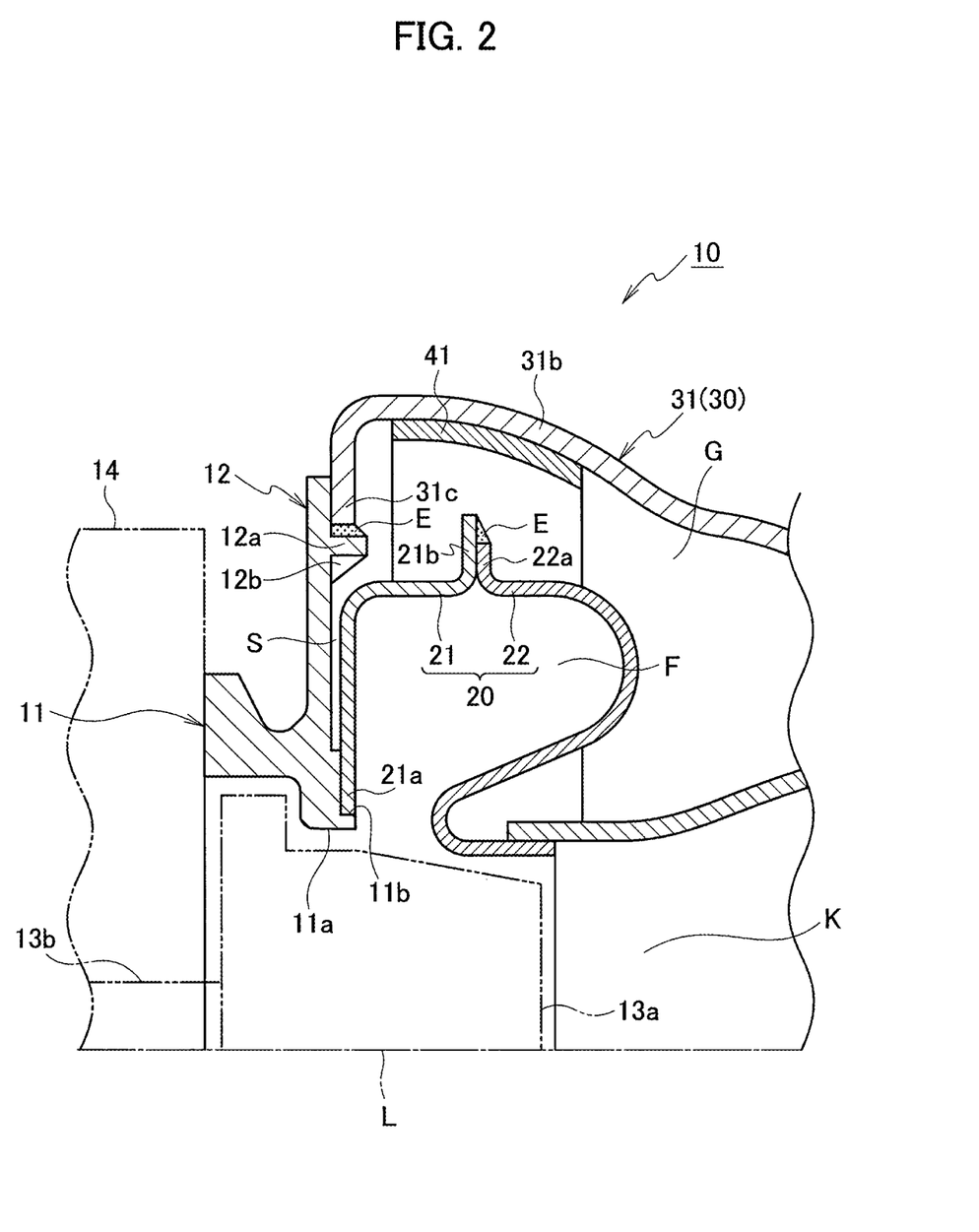
FIG. 2 is an enlarged cross-sectional view of a main part of the turbine housing.
Figure 3:
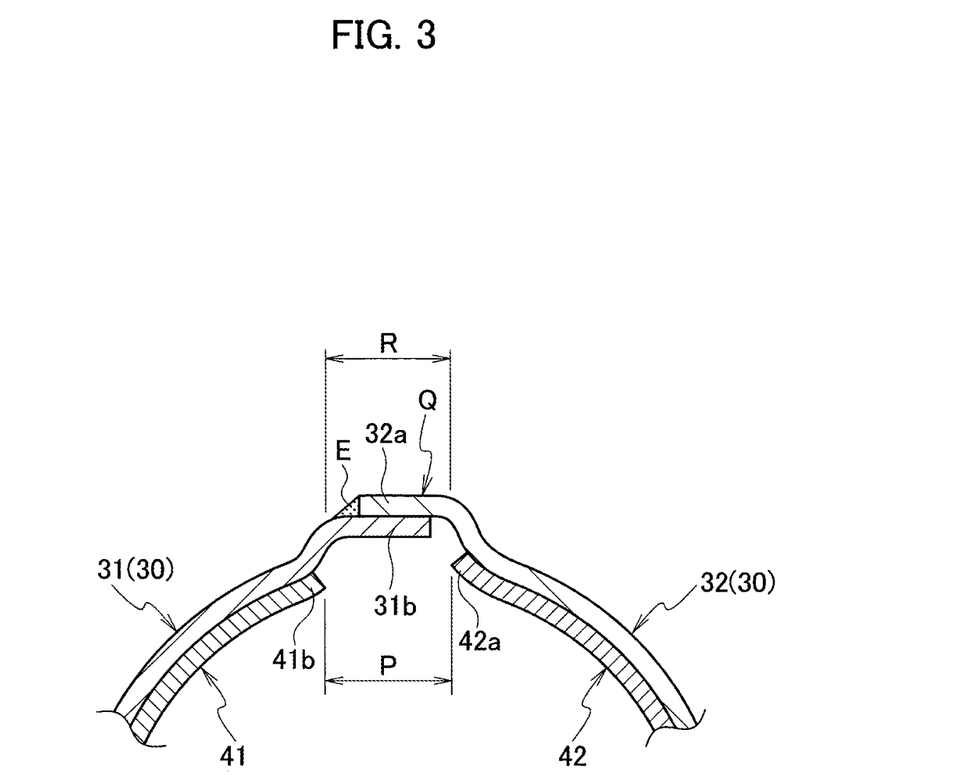
FIG. 3 is a partial cross-sectional view of a main part of the turbine housing illustrating a connection state of an outer pipe of the turbine housing.

FIG. 1 is a side view of a turbine housing made of a sheet metal for use in a turbo charger according to a first embodiment of the present invention, FIG. 2 is an enlarged cross-sectional view of a main part of the turbine housing, and FIG. 3 is a partial cross-sectional view of a main part of the turbine housing illustrating a connection state of an outer pipe of the turbine housing.

As illustrated in FIGS. 1 and 2, a turbine housing 10 is used as a housing for a turbo charger (turbo supercharger) of a vehicle. The turbine housing 10 has a so-called double shell structure including an inner pipe 20 and an outer pipe 30 respectively secured by welding to a flange 11 on an intake air side including a turbine wheel 13a and constituting an entrance of intake air (intake air) A, a flange 15 on an exhaust air entrance side constituting an entrance of exhaust gas B, and a flange 16 on an exhaust air exit side (downstream side of exhaust air flow) constituting an exit of the exhaust gas B.

As illustrated in FIG. 1, to the flange 11 on the intake air side is connected a compressor 14 taking the intake air A from the outside. To the flange 16 on the exhaust air exit side exhausting the exhaust gas B is connected a not-illustrated catalytic converter eliminating a harmful contaminant from the exhaust gas B. That is, the turbine housing 10 is interposed between the compressor 14 on the intake air side and the catalytic converter.

As illustrated in FIG. 2, the inner pipe 20 substantially defines and forms an exhaust air flow path K of the exhaust gas B in the housing 10. The outer pipe 30 is an outer shell structure completely covering the inner pipe 20 at a gap G (predetermined distance) to function to protect and thermally insulate the inner pipe 20 and to increase the rigidity of the turbine housing 10.

The inner pipe 20 includes two thin plate members made of sheet metals, a first inner pipe divided body 21 and a second inner pipe divided body 22, formed by dividing the inner pipe 20 into two in a direction perpendicular to an axial direction L of a turbine shaft 13b of the turbine wheel 13a. The first inner pipe divided body 21 and the second inner pipe divided body 22 are formed in predetermined curved shapes by pressing sheet metals. By connecting the two press-formed sheet metals, the first inner pipe divided body 21 and the second inner pipe divided body 22, by welding, the L-shaped exhaust air flow path K is formed in the turbine housing 10. As illustrated in FIGS. 2 and 3, a second end 21b of the first inner pipe divided body 21 and a first end 22a of the second inner pipe divided body 22 are bent outward perpendicularly so that the lengths thereof may differ. By securing the ends 21b and 22a by welding, the inner pipe 20 is formed. The welded part is illustrated by reference sign E.

Also, the outer pipe 30 includes two thin plate members made of sheet metals, a first outer pipe divided body 31 and a second outer pipe divided body 32, formed by dividing the outer pipe 30 into two in the axial direction L (vibration direction when the vehicle runs) of the turbine shaft 13b of the turbine wheel 13a. The first outer pipe divided body 31 and the second outer pipe divided body 32 are formed in predetermined curved shapes by pressing sheet metals. The two press-formed sheet metals, the first outer pipe divided body 31 and the second outer pipe divided body 32, are connected by welding. The outer pipe 30 completely covers the inner pipe 20 at the gap G. As illustrated in FIGS. 1 to 3, the first outer pipe divided body 31 and the second outer pipe divided body 32 overlap with and are secured to each other by welding along the axial direction (axial linear direction) L of the turbine shaft 13b of the turbine wheel 13a. The welded part is illustrated by reference sign E.

Further, as illustrated in FIGS. 1 to 3, on each of the inner surfaces of the first outer pipe divided body 31 and the second outer pipe divided body 32 included in the outer pipe 30, each of plates (reinforcing plates) 41 and 42 press-formed to go along the curved shape of the outer pipe 30 and made of sheet metals is secured by at least one-point welding (point-like welding). It is preferable that symmetry centers O of the respective plates 41 and 42 are partially welded.

As illustrated in FIG. 3, when each of the plates 41 and 42 is secured by at least one-point welding to each of the inner surfaces of the first outer pipe divided body 31 and the second outer pipe divided body 32, a clearance P is formed between respective opposed ends 41b and 42a of the adjacent plates 41 and 42. The clearance P is formed to have a width (length) R of an overlapping part Q of the respective ends 31b and 32a of the first outer pipe divided body 31 and the second outer pipe divided body 32 or longer (equal to or longer than the width R of the overlapping part Q).

Figure 4:
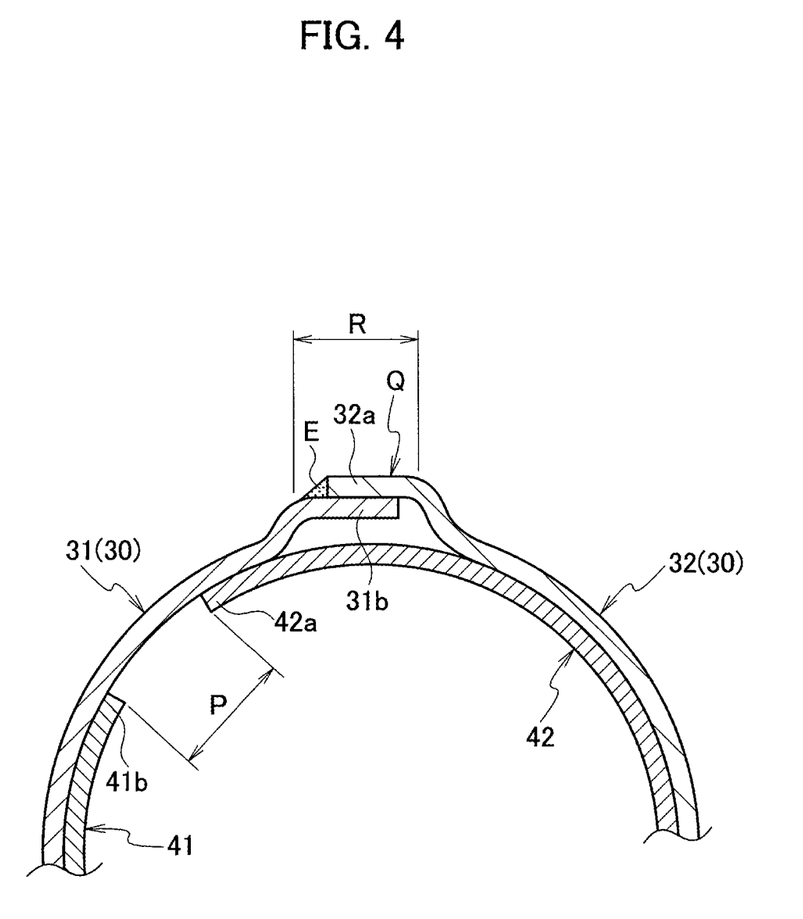
FIG. 4 is a partial cross-sectional view of a main part of the turbine housing according to the first embodiment illustrating a connection state of a variation of the outer pipe of the turbine housing.

Also, as in a variation of the outer pipe 30 illustrated in FIG. 4, one plate 42 may be arranged to cover the overlapping part Q of the respective ends 31b and 32a of the first outer pipe divided body 31 and the second outer pipe divided body 32 and to straddle the respective inner surfaces of the first outer pipe divided body 31 and the second outer pipe divided body 32, and each of the plates 41 and 42 may be secured to each of the inner surfaces of the first outer pipe divided body 31 and the second outer pipe divided body 32 by at least one-point welding.

As illustrated in FIG. 1, a first end 31a of the first outer pipe divided body 31 and a second end (not illustrated) of the second outer pipe divided body 32 are formed in semicircular arc shapes along an opening portion (not illustrated) of the flange 15 on the exhaust air entrance side and are secured to the flange 15 on the exhaust air entrance side around the opening portion (not illustrated) by welding.

As illustrated in FIG. 2, the flange 11 on the intake air side is formed in an annular shape having a circular opening portion 11a. The flange 11 on the intake air side is provided on an outer circumferential side thereof with an annular plate-like projection 12 extending further outward than the turbine shaft 13b of the turbine wheel 13a. The annular plate-like projection 12 has a larger circumference than a circumference of the scroll inner pipe 20 in which a scroll chamber F is formed by the first inner pipe divided body 21 and the second inner pipe divided body 22. To a step 11b around the opening portion 11a of the flange 11 on the intake air side located on the inner end side of the opening portion 11a, a first end 21a of the first inner pipe divided body 21 is secured by welding. Hence, as illustrated in FIG. 2, a space S is formed between the first inner pipe divided body 21 and the projection 12.

Also, as illustrated in FIGS. 2 and 3, the projection 12 is provided on an outer end side of the flange 11 with a positioning protrusion 12a positioning one side end 31c of the first outer pipe divided body 31. Between a lower surface of the positioning protrusion 12a and an inner circumferential surface of the projection 12, reinforcing ribs 12b formed in triangular plate shapes are integrally projected and formed at regular intervals. The positioning protrusion 12a of the projection 12 is secured by welding the protrusion 12a to the first outer pipe divided body 31 or a part of the first outer pipe divided body 31 and the second outer pipe divided body 32 or a part of the second outer pipe divided body 32. Hence, the outer pipe 30 and the welded part E of the projection 12 are located further outward than the scroll inner pipe 20.

As described above, with the turbine housing 10 according to the embodiment, by securing each of the plate (reinforcing plates) 41 and 42 to each of the inner surfaces of the first outer pipe divided body 31 and the second outer pipe divided body 32 included in the outer pipe 30 by at least one-point welding, strain and deformation of the first outer pipe divided body 31 and the second outer pipe divided body 32 included in the outer pipe 30 can reliably be prevented, and amplitude of the entire outer pipe 30 can be attenuated. That is, due to securement by at least one-point welding, the first outer pipe divided body 31 and the second outer pipe divided body 32 included in the outer pipe 30 can have attenuation performance, and strain of the first outer pipe divided body 31 and the second outer pipe divided body 32 caused by heat expansion can effectively be prevented.

Also, by partially welding each of the plates 41 and 42 in at least one point in each of the symmetry centers O, the first outer pipe divided body 31 and the second outer pipe divided body 32 can symmetrically be heat-expanded, and strain and stress at a welded point can effectively be dispersed. That is, to surface vibration of the outer pipe 30 resulting from an external vibratory force action, each of the plates 41 and 42 welded in at least one point in each of the symmetry centers O exerts an opposing force caused by the plate rigidity in a direction perpendicular to the plate surface, is vibrated while contacting the surface vibration of the outer pipe 30, and generates a frictional force in a sliding direction on the vibration surface in accordance with the opposing force. A friction attenuation effect resulting from the friction dissipating energy enables resonant amplitude of the outer pipe 30 to be decreased.

Further, since the clearance P is formed between the respective opposed ends 41b and 42a of the adjacent plates 41 and 42, collision between the adjacent plates 41 and 42 caused by heat expansion can be prevented.

Still further, the overlapping part Q of the first outer pipe divided body 31 and the second outer pipe divided body 32 included in the outer pipe 30 has a double-layered structure. The overlapping part Q is provided with a part absorbing heat expansion (width R). The clearance P between the respective opposed ends 41b and 42a of the adjacent plates 41 and 42 has the width R of the overlapping part Q of the first outer pipe divided body 31 and the second outer pipe divided body 32 or longer. Such a configuration can further decrease an effect on the entire rigidity than in a case of providing a space in another single-layered part.

Also, in the variation of the outer pipe 30 illustrated in FIG. 4, one plate 42 is arranged to cover the overlapping part Q of the respective ends 31b and 32a of the first outer pipe divided body 31 and the second outer pipe divided body 32 and to straddle the respective inner surfaces of the first outer pipe divided body 31 and the second outer pipe divided body 32, and each of the plates 41 and 42 is secured to each of the inner surfaces of the first outer pipe divided body 31 and the second outer pipe divided body 32 by at least one-point welding. Accordingly, a part in which stress is least concentrated can be selected, and each of the plates 41 and 42 can be secured to each of the inner surfaces of the first outer pipe divided body 31 and the second outer pipe divided body 32 by at least one-point welding.

Further, the first outer pipe divided body 31 and the second outer pipe divided body 32 included in the outer pipe 30 obtained by dividing the outer pipe 30 into two in the axial direction L of the turbine shaft 13b of the turbine wheel 13a, which is the vibration direction when the vehicle runs, are connected at the adjacent ends 31b and 32a by welding. Accordingly, stress resulting from vibration when the vehicle runs can be alleviated, and breakage of the welded part E of the adjacent ends 31b and 32a of the first outer pipe divided body 31 and the second outer pipe divided body 32 can reliably be prevented. Consequently, the turbine housing 10 made of a sheet metal in which the temporal state of the welded part E is more stable can be provided at low cost.

Figure 5:
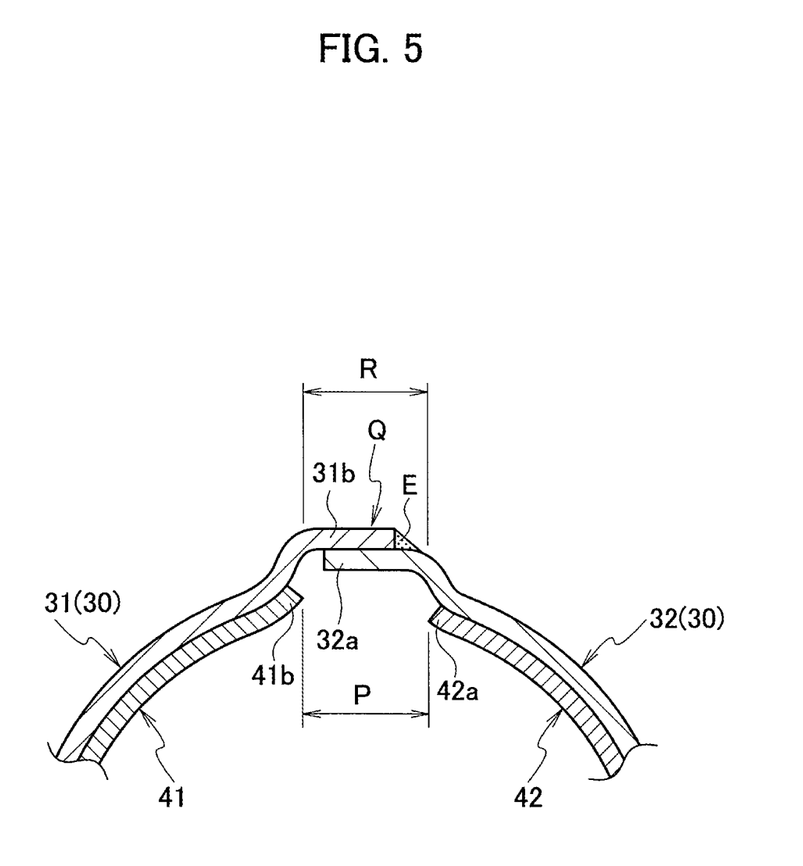
FIG. 5 is a partial cross-sectional view of a main part of the turbine housing according to a second embodiment of the present invention illustrating a connection state of the outer pipe.
Figure 6:
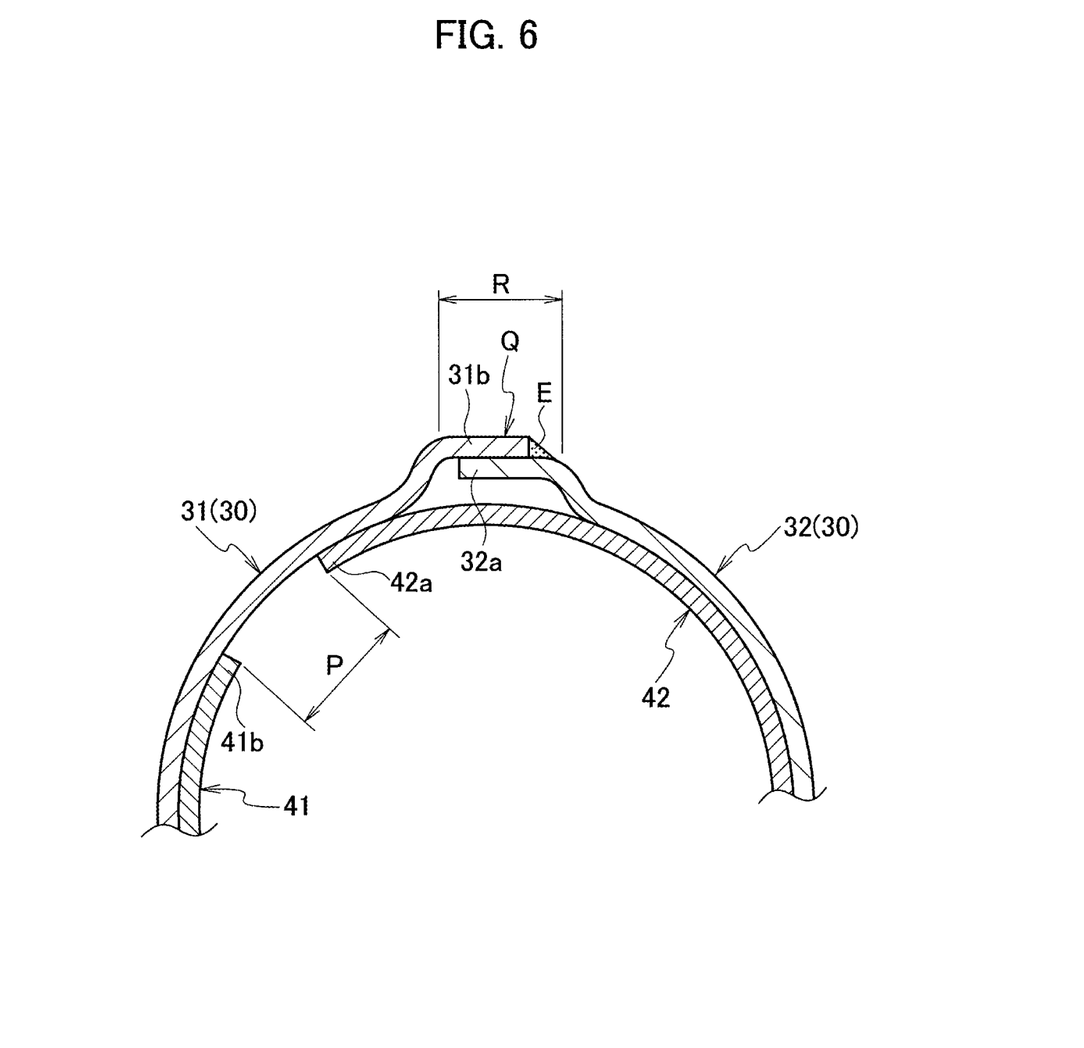
FIG. 6 is a partial cross-sectional view of a main part of the turbine housing according to the second embodiment illustrating a connection state of a variation of the outer pipe.

FIG. 5 is a partial cross-sectional view of a main part of the turbine housing according to a second embodiment of the present invention illustrating a connection state of the outer pipe, and FIG. 6 is a partial cross-sectional view of a main part of the turbine housing illustrating a connection state of a variation of the outer pipe.

As illustrated in FIG. 5, in the second embodiment, the stepped second end 31b of the first outer pipe divided body 31 included in the outer pipe 30 is piled on the stepped first end 32a of the second outer pipe divided body 32, and the first outer pipe divided body 31 and the second outer pipe divided body 32 are secured to each other by welding along the axial direction L of the turbine shaft 13b of the turbine wheel 13a.

Also, as illustrated in FIG. 5, on each of the inner surfaces of the first outer pipe divided body 31 and the second outer pipe divided body 32 included in the outer pipe 30, each of the plates (reinforcing plates) 41 and 42 press-formed to go along the curved shape of the outer pipe 30 and made of sheet metals is secured by at least one-point welding. At this time, the clearance P is formed between the respective opposed ends 41b and 42a of the adjacent plates 41 and 42. The clearance P is formed to have the width R of the overlapping part Q of the respective ends 31b and 32a of the first outer pipe divided body 31 and the second outer pipe divided body 32 or longer (equal to or longer than the width R of the overlapping part Q).

Accordingly, a similar effect to that in the first embodiment is exerted.

Further, as for the outer pipe 30, as in a variation illustrated in FIG. 6, one plate 42 may be arranged to cover the overlapping part Q of the respective ends 31b and 32a of the first outer pipe divided body 31 and the second outer pipe divided body 32 and to straddle the respective inner surfaces of the first outer pipe divided body 31 and the second outer pipe divided body 32, and each of the plates 41 and 42 may be secured to each of the inner surfaces of the first outer pipe divided body 31 and the second outer pipe divided body 32 by at least one-point welding.

Accordingly, a similar effect to that in the variation of the first embodiment is exerted.

Meanwhile, in each of the aforementioned embodiments, although each of the reinforcing plates is secured to each of the inner surfaces of the two thin plate members included in the outer pipe by at least one-point welding, one reinforcing plate may be secured to the inner surfaces of the two thin plate members by at least one-point welding for each of the inner surfaces, or at least one reinforcing plate may be secured to outer surfaces of the two thin plate members by at least one-point welding for each of the outer surfaces.

Also, in each of the aforementioned embodiments, although the outer pipe includes the two thin plate members divided in the axial direction of the turbine shaft of the turbine wheel, each of the reinforcing plates may be secured to each of inner surfaces of two thin plate members divided in a direction perpendicular to the axial direction of the turbine shaft of the turbine wheel by at least one-point welding.

Figure 7:
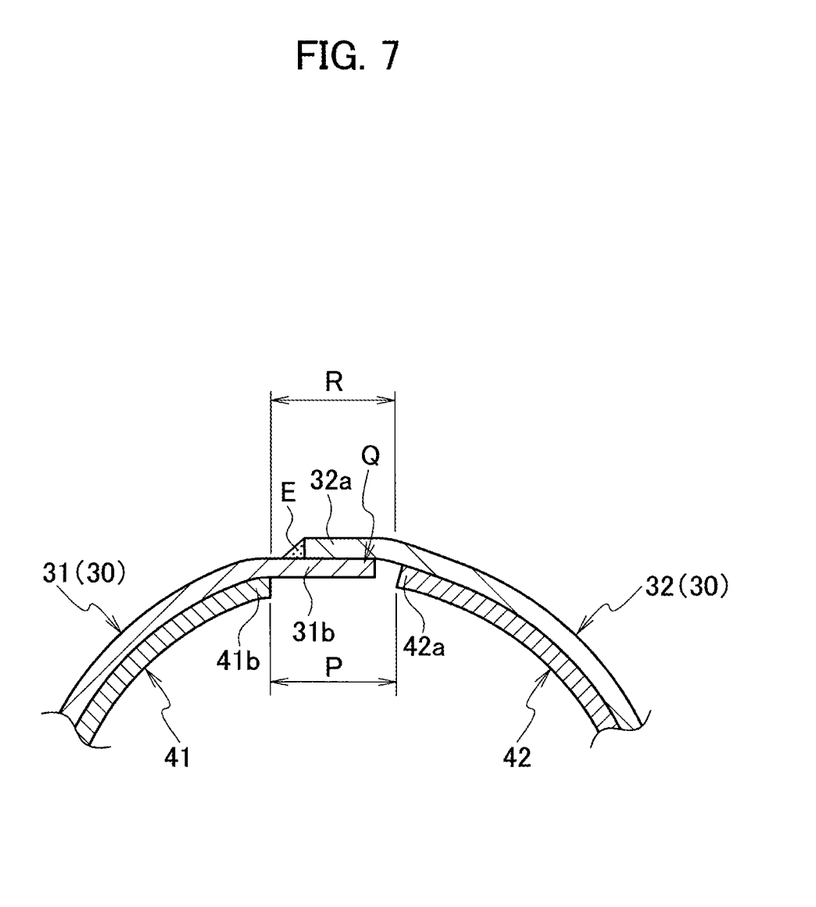
FIG. 7 is a partial cross-sectional view of a main part of the turbine housing according to a third embodiment of the present invention illustrating a connection state of the outer pipe.

The phrase "at least one-point welding" described in the present description means that welding may be performed in one point or in a plurality of neighbor points. Also, although the present description describes that the reinforcing member is secured in the symmetry center of the reinforcing member, the reinforcing member may be secured in a part out of the center as long as the object of the present invention can be achieved. Meanwhile, the overlapping part Q (welded part) of the first outer pipe divided body 31 and the second outer pipe divided body 32 of the outer pipe 30 in FIGS. 3 to 6 is formed to further project than the first outer pipe divided body 31 and the second outer pipe divided body 32. However, the present invention is not limited to this, and the overlapping part Q (welded part) of the first outer pipe divided body 31 and the second outer pipe divided body 32 of the outer pipe 30 may not be in a projecting state as in a third embodiment illustrated in FIG. 7.

It should be noted that the present application claims priority to Japanese Patent Application No. 2015-059441, filed on Mar. 23, 2015, the entire contents of which are incorporated by reference herein.

INDUSTRIAL APPLICABILITY

In turbine housing according to one aspect of the present invention, an outer pipe is formed from divided thin plate members, and the reinforcing plate is fixed to the inner surface of the outer pipe, whereby the amplitude of the entire outer pipe can be attenuated.

REFERENCE SIGNS LIST

10 TURBINE HOUSING
13a TURBINE WHEEL
13b TURBINE SHAFT
14 COMPRESSOR
20 INNER PIPE
30 OUTER PIPE
31 FIRST OUTER PIPE DIVIDED BODY (THIN PLATE MEMBER)
32 SECOND OUTER PIPE DIVIDED BODY (THIN PLATE MEMBER)
41, 42 PLATE (REINFORCING PLATE)
K EXHAUST AIR FLOW PATH
G GAP (PREDETERMINED DISTANCE)
L AXIAL DIRECTION
O SYMMETRY CENTER
P SPACE
Q OVERLAPPING PART
R WIDTH OF OVERLAPPING PART

The invention claimed is:

1. A turbine housing comprising:
an inner pipe forming an exhaust air flow path in which a turbine wheel is arranged; and
an outer pipe formed of sheet metal plate member and covering the inner pipe in a state where a space is interposed between the outer pipe and the inner pipe,
wherein a reinforcing plate is secured to a part of the outer pipe while being separated from the inner pipe, and
wherein the reinforcing plate is secured to the outer pipe by welding at least one point such that a non-welded portion exists, and is configured to prevent strain and deformation of the outer pipe.

2. The turbine housing according to claim 1, wherein a symmetry center of the reinforcing plate is partially welded.

3. A turbine housing comprising:
an inner pipe forming an exhaust air flow path in which a turbine wheel is arranged; and
an outer pipe covering the inner pipe in a state where a space is interposed between the outer pipe and the inner pipe, wherein
a reinforcing plate is secured to a part of the outer pipe while being separated from the inner pipe,
a plurality of the reinforcing plates are secured to the inner surface of the outer pipe, and
adjacent reinforcing plates are arranged with a clearance.

4. The turbine housing according to claim 3, wherein
the outer pipe is formed by joining at least two plate members,
end portions of the plate members are overlapped and secured to each other by welding along an axial direction of the turbine wheel, and
at least one reinforcing plate member is secured to each of the plate members.

5. The turbine housing according to claim 4, wherein at least two of the reinforcing plate members are arranged with the overlapped portion of the plate member interposed therebetween.

* * * * *